(12) United States Patent
Murphy

(10) Patent No.: US 7,373,223 B2
(45) Date of Patent: May 13, 2008

(54) GLOBAL NAVIGATION SATELLITE SYSTEM LANDING SYSTEMS AND METHODS

(75) Inventor: Timothy A. Murphy, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 428 days.

(21) Appl. No.: 10/778,725

(22) Filed: Feb. 13, 2004

(65) Prior Publication Data
US 2005/0182530 A1 Aug. 18, 2005

(51) Int. Cl.
*G06F 19/00* (2006.01)
(52) U.S. Cl. ............. 701/16; 701/4; 701/5; 340/951; 342/34
(58) Field of Classification Search .......... 701/16, 701/4, 5; 340/951; 342/33, 34
See application file for complete search history.

(56) References Cited

U.S. PATENT DOCUMENTS

| 3,580,080 | A | * | 5/1971 | Perkins ................. 73/384 |
| 5,136,512 | A | * | 8/1992 | Le Borne ............... 701/301 |
| 5,361,212 | A | * | 11/1994 | Class et al. ............ 701/16 |
| 5,654,890 | A | * | 8/1997 | Nicosia et al. .......... 701/16 |
| 5,820,080 | A | * | 10/1998 | Eschenbach ............ 244/183 |
| 5,952,961 | A | * | 9/1999 | Denninger ............ 342/357.08 |
| 6,342,853 | B1 | * | 1/2002 | Kalafus et al. ........ 342/357.03 |
| 6,462,703 | B2 | * | 10/2002 | Hedrick ................ 342/120 |
| 6,845,304 | B1 | * | 1/2005 | Young ................... 701/16 |
| 2004/0088111 | A1 | * | 5/2004 | Ahlbrecht et al. ....... 701/213 |
| 2005/0182530 | A1 | * | 8/2005 | Murphy ................. 701/16 |

* cited by examiner

*Primary Examiner*—Khoi H. Tran
*Assistant Examiner*—Marie A Weiskopf
(74) *Attorney, Agent, or Firm*—Lee & Hayes, PLLC

(57) ABSTRACT

A method and system are provided for performing satellite-supported landings in CAT II/III type landing conditions. An exemplary system includes a communication component, a positioning system, a radar altimeter, and a processor. The communication component receives terrain data information related to an instrument landing approach. The positioning system determines position of the aircraft. The radar altimeter generates altitude information of the aircraft. The processor is coupled to the communication component, the positioning system, and the radar altimeter. The processor determines an aircraft altitude based on the determined position of the aircraft, received terrain data information, and the generated altitude information.

29 Claims, 6 Drawing Sheets

GLOBAL NAVIGATION SATELLITE SYSTEM LANDING SYSTEMS AND METHODS

FIELD OF THE INVENTION

This invention relates generally to aircraft and, more specifically, to aircraft landing guidance systems.

BACKGROUND OF THE INVENTION

The aviation industry is developing new approach and landing systems based on the global navigation satellite system (GNSS). A GNSS Landing System (GLS) integrates satellite and ground-based navigation information to provide position information required for approach and landing guidance. The potential benefits of the GLS include significantly improved take-off and landing capability at airports worldwide, reduced cost, and improved instrument approach service at additional airports and runways. GLS may eventually replace the Instrument Landing System (ILS) which is the current standard for civil precision approach and landing systems.

One of most demanding aviation applications for GNSS is low visibility approach and landing. The most demanding of these precision approach and landing operations in the US are called "Category I" (CAT I), "Category II" (CAT II) and "Category III" (CAT III). During a CAT I operation, a pilot may continue a descent to land, with a runway visual range (RVR) as low as 1800 ft, until the aircraft is only 200 ft above the runway surface. At this time if he decides there are inadequate visual cues to safely land the aircraft, he aborts the landing attempt. During a CAT II operation, a pilot may continue, with a RVR as low as 1200 ft, until only 100 ft above the surface. During a demanding CAT III operation, a pilot may land with an RVR of only 150 ft. Highly reliable and accurate positioning and navigation are required throughout these operations.

GLS is based on a form of GNSS augmentation known as the Ground Based Augmentation System (GBAS). The International Civil Aviation Organization (ICAO) currently defines Standards and Recommended Practices (SARPs) for a GBAS architecture that is suitable for airplane approach and landing operations in Category I (CAT I) conditions. However, the currently defined GBAS architecture does not support approach and landing operations in Category II/III (CAT II/III) conditions.

Definition of a GBAS architecture to support approach and landing operations in Category II/III conditions has been difficult. This is because the current GPS satellite constellation alone does not provide with high availability a sufficiently robust geometry between the satellites and user needed to provide the sufficient accuracy and integrity performance to support this type of operation.

A method that has been suggested for augmenting the current GPS constellation is to include pseudo-satellites (pseudolites). A pseudolite is a transmitter placed on the ground at a known location. The pseudolite broadcasts a signal similar to the GPS navigation satellite signal and can provide a highly accurate range measurement. However, pseudolites can interfere with the normal reception of GPS signals. Also, pseudolites are potentially expensive and, at a minimum, entail increased ground infrastructure costs.

Another potential solution for augmenting the current GPS constellation relies on tight integration of GPS receivers and on-board inertial systems (INS). GPS/INS integration is also relatively expensive. Also, this solution is still ultimately limited by the coverage offered by the GPS satellite constellation.

Therefore, there exists an unmet need for a satellite-supported landing system that meets requirements to perform CAT II/III type landing approaches.

SUMMARY OF THE INVENTION

The present invention provides a method and system for performing satellite-supported landings in CAT II/III type landing conditions. An exemplary system includes a communication component, a positioning system, a radar altimeter, and a processor. The communication component receives terrain data information related to an instrument landing approach. The positioning system determines position of the aircraft. The radar altimeter generates altitude information of the aircraft above the terrain. The processor is coupled to the communication component, the positioning system, and the radar altimeter. The processor determines the precise aircraft position relative to the runway based on a proper combination of the navigation satellite signals, the augmentation data received from the ground segment, the radar altimeter measurements of height above the terrain and the terrain data received from the ground segment.

In one embodiment of the invention, the processor combines differentially corrected pseudoranges together with radar altimeter information corrected with the uplinked terrain data in a weighted least squares solution in order to determine a precise airplane position relative to a desired flight path. The determined aircraft position relative to a desired flight path is then sent to an autopilot or an aircraft display.

In another embodiment of the invention, the processor identifies the appropriate terrain data component of the received terrain data information based on the lateral position of the airplane as determined by the differential global positioning information. The processor then adjusts the generated radar altimeter altitude information based on the identified terrain data, and determines an aircraft altitude based on the adjusted altitude information alone. In this embodiment, the adjusted radar altimeter based height can be compared to the vertical position as determined by the differential GNSS system as a means of fault detection.

In still another aspect of the invention, the system includes an inertial system that generates at least one of velocity or acceleration information for one or more axes of the aircraft. The processor obtains the aircraft position solution using the generated radar altimeter altitude information, the differential GNSS pseudoranges, aircraft attitude information, and the at least one of velocity or acceleration information for one or more axis of the aircraft. This information is combined in a weighted least squares solution or Kalman filter in order to obtain an optimal combination of all the information provided.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
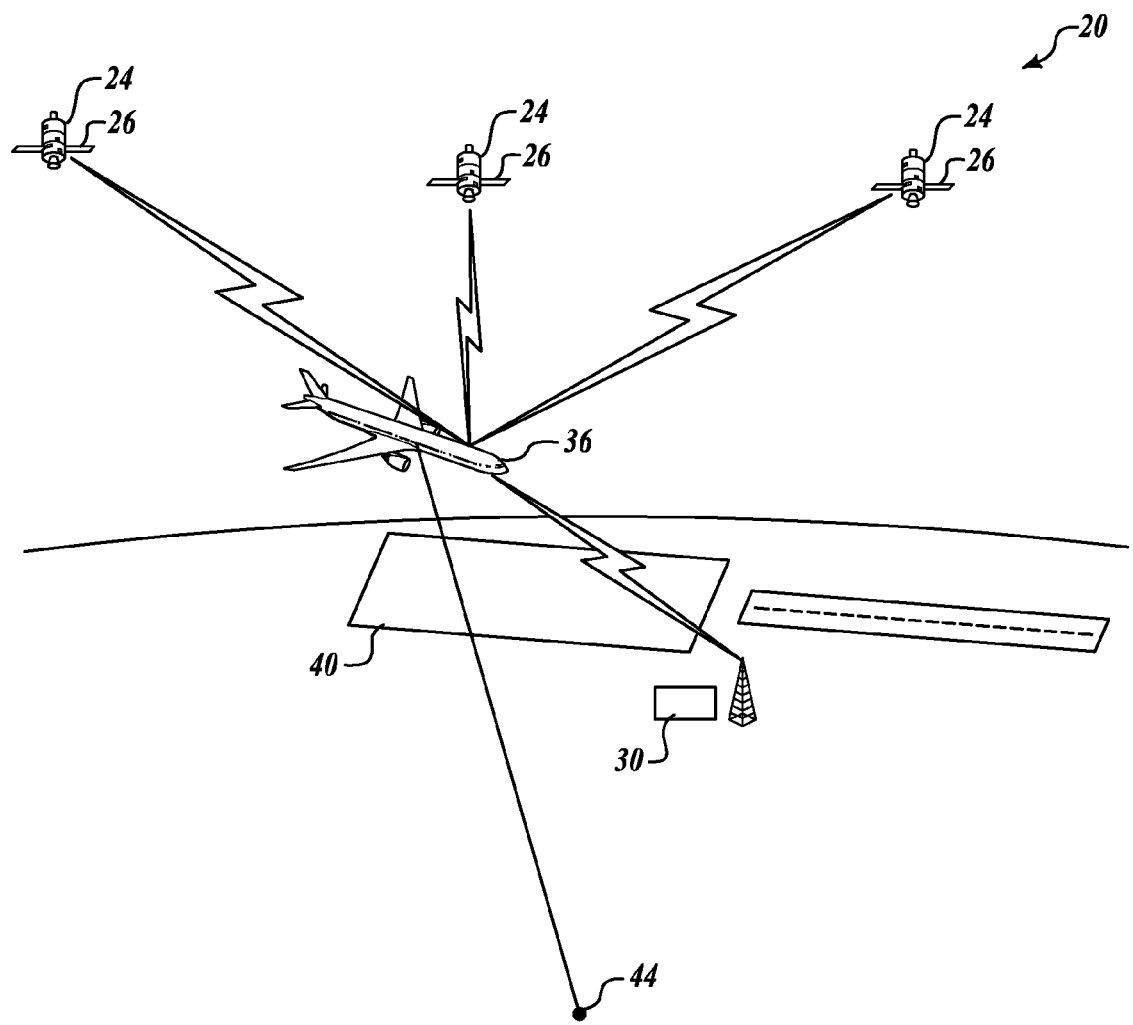
FIG. 1 illustrates a perspective view of components of an embodiment of the present invention.

The present invention provides systems and methods for accurately identifying a location of an aircraft in order to provide accurate information for aiding in a pilot-controlled or an autopilot-controlled CAT II/III instrument landing approach. Referring to FIG. 1, an exemplary system 20 includes a global navigation satellite system (GNSS) 24 and a ground-based augmentation system (GBAS) 30. The GNSS 24 includes a plurality of satellites 26. An aircraft 36, when beginning an instrument landing approach, receives pseudorange information from the GNSS 24 and pseudorange corrections from the GBAS 30. The GBAS 30 also sends detailed terrain data of an area of terrain 40 under the approach that the aircraft 36 is performing. The aircraft 36 determines its position based on the received pseudorange information, the received terrain data information (such as without limitation World Geodetic System (WGS)-84 data) and radar altimeter information. The determined position information is presented to the flight crew of the aircraft 36 on multi-function displays or heads-up displays (not shown) and/or is sent to an autopilot system (not shown).

Figure 2:
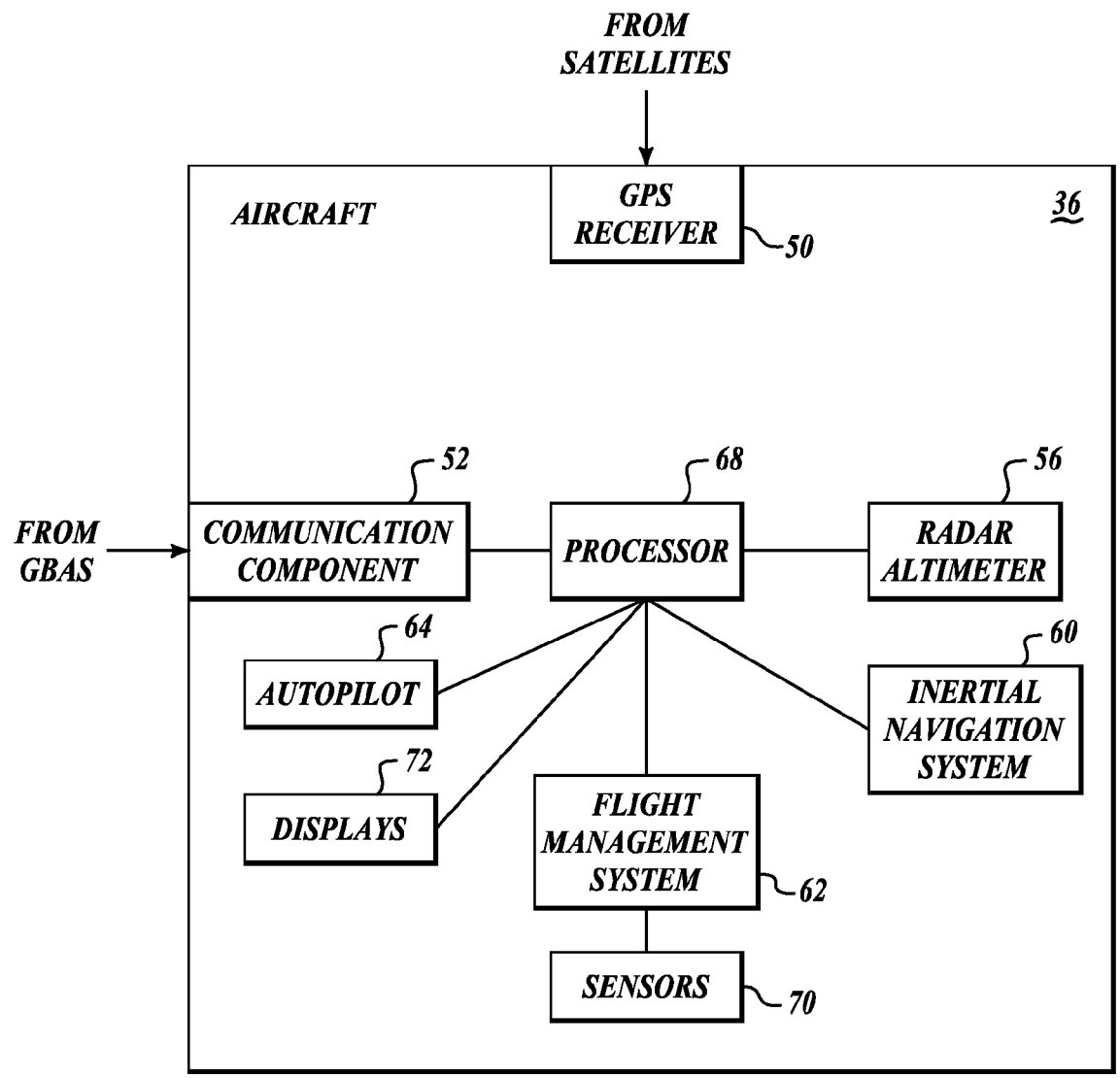
FIG. 2 illustrates a block diagram of components of an exemplary aircraft system formed in accordance with an embodiment of the present invention.

Referring to FIG. 2, in one embodiment, the aircraft 36 includes a Global Positioning System (GPS) receiver 50, a communication component 52, a radar altimeter 56, an Inertial Navigation System (INS) 60, a Flight Management System (FMS) 62, an autopilot 64, and displays 72 all of which are coupled to a processor 68. The FMS 62 is coupled to numerous aircraft sensors 70. In another embodiment, the FMS 62 is not present and the aircraft sensors 70, such as without limitation altimeter, airspeed, etc., are coupled directly to the processor 68 or the functions performed by the processor 68 are done by the FMS 62.

The communication component can be any suitable datalink receiver. For the GBAS currently defined by ICAO, the augmentation data is delivered to the airplane by means of a VHF Data Broadcast (VDB) signal transmitted by the ground segment in the 108-118 MHz band. In the airborne implementation, the datalink receiver simply demodulates all the received data and passes it on to the processing function.

The GPS receiver 50 receives navigation information from the satellites 26 of the GNSS 24 by means of a pseudorandom noise (PRN) coded signal. The navigation information includes means to determine the time of transmission of the signal from the satellite. The structure of the PRN coded signal allows the user to precisely determine the time of arrival of the signal at the user antenna. Hence, the user can determine the apparent range between the satellite and the user's antenna by multiplying the difference between the time of arrival and the time of transmission of the signal by the speed of light. Because the user's clock is not synchronized precisely with the satellite clock, an offset between the user's receiver time and the satellite time causes the apparent range to differ from the true range by the clock offset multiplied by the speed of light. For this reason, the measurement based on the apparent signal transit time is referred to as a 'pseudorange' as it includes an unresolved user clock bias. The clock bias is common to all pseudoranges measured by a given receiver. In the course of solving for the position solution, the user receiver also solves for this receiver clock offset. The manner in which a GNSS receiver performs this basic positioning is well known in the art. The received satellite pseudorange information is sent to the processor 68. A datalink between the communication component 52 and the GBAS 30 allows information about the GBAS 30, GNSS pseudorange correction information, final approach segment (FAS) information and/or terrain data to be sent to the aircraft 36. The processor 68 determines the three dimensional position of the aircraft based on the pseudorange data produced by the GPS receiver 50, the GPS pseudorange correction information received by the communication component 52, the terrain data received by the communication component 52, altitude information received from the radar altimeter 56, and aircraft motion and attitude information generated by the INS 60.

Figure 3A:
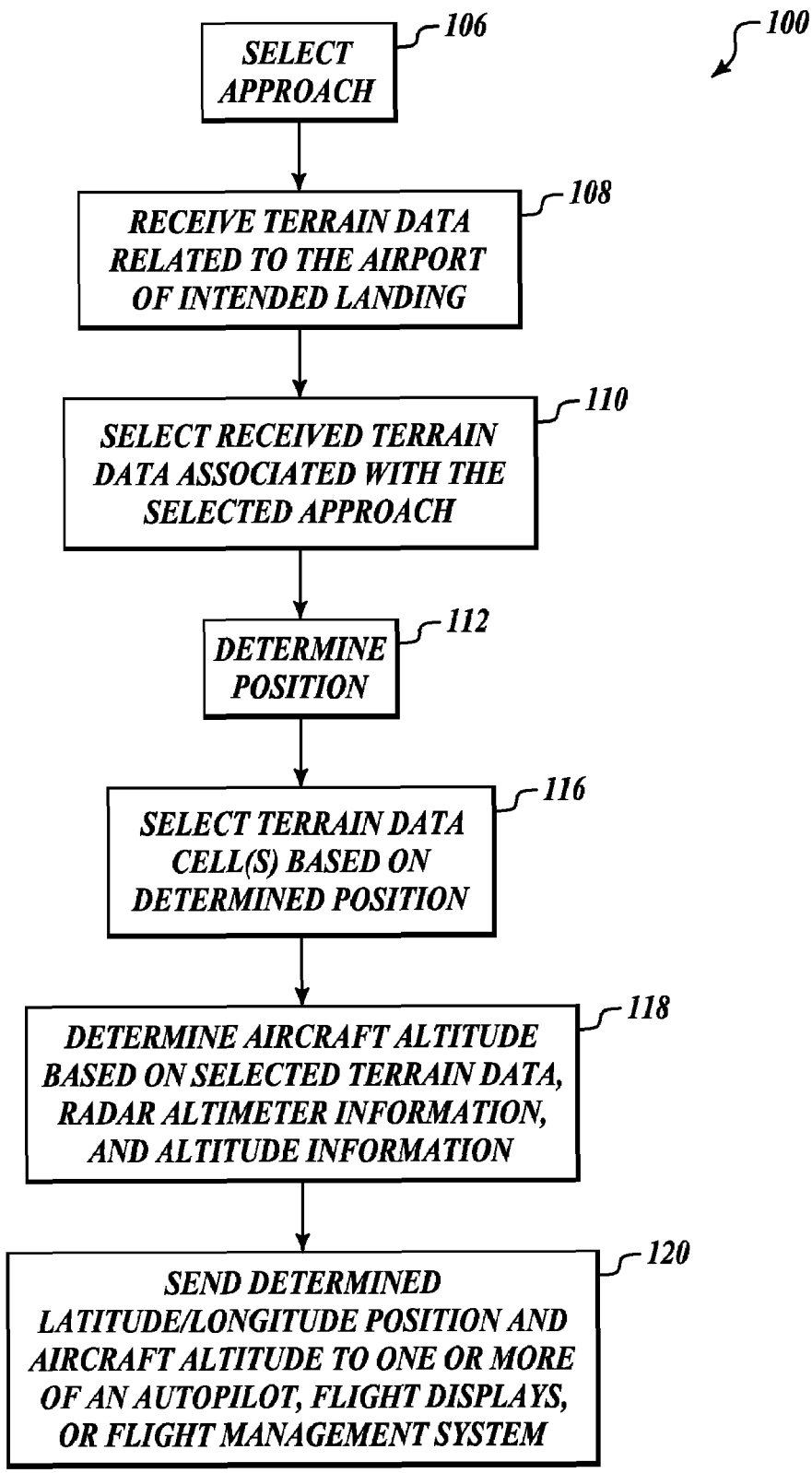
FIGS. 3A and 3B illustrate exemplary processes performed by the systems shown in FIGS. 1 and 2.

Referring to FIGS. 1 and 3A, an exemplary process 100 is performed by the processor 68. The process 100 begins at a block 106, where an instrument landing approach is selected. The instrument landing approach may be automatically selected according to a predefined flight plan, or may be manually selected by the flight crew. At a block 108, the processor 68 receives terrain data from the GBAS 30 via a datalink with the communication component 52. The received terrain data associated with the selected approach is selected at a block 110. At a block 112, the position of the aircraft 36 is determined. The position of the aircraft 36 may be determined by a number known methods. For example, the latitude and longitude position of the aircraft is determined by well known methods of differential GNSS by using information received from the GBAS 30.

At a block 116, the processor 68 determines the terrain data cells to be analyzed based on the determined position. At a block 118, the processor 68 determines aircraft altitude based on the selected terrain data cell(s), radar altimeter information and height information received from the GNSS 24 and the GBAS 30. The processor 68 determines a more accurate altitude of the aircraft 36 by using the selected terrain data cell(s) altitude, and the radar altimeter information to form a range measurement from the aircraft to the center of the earth 44. When the radar altimeter based range is combined with the differentially corrected GPS information, a more accurate aircraft altitude is determined because radar altimeter based range acts as a pseudorange to a satellite placed at the center of the earth 44. At a block 120, the determined position information and aircraft altitude are sent to one or more of the autopilot 64 or the displays 72 via the FMS 62.

Figure 3B:
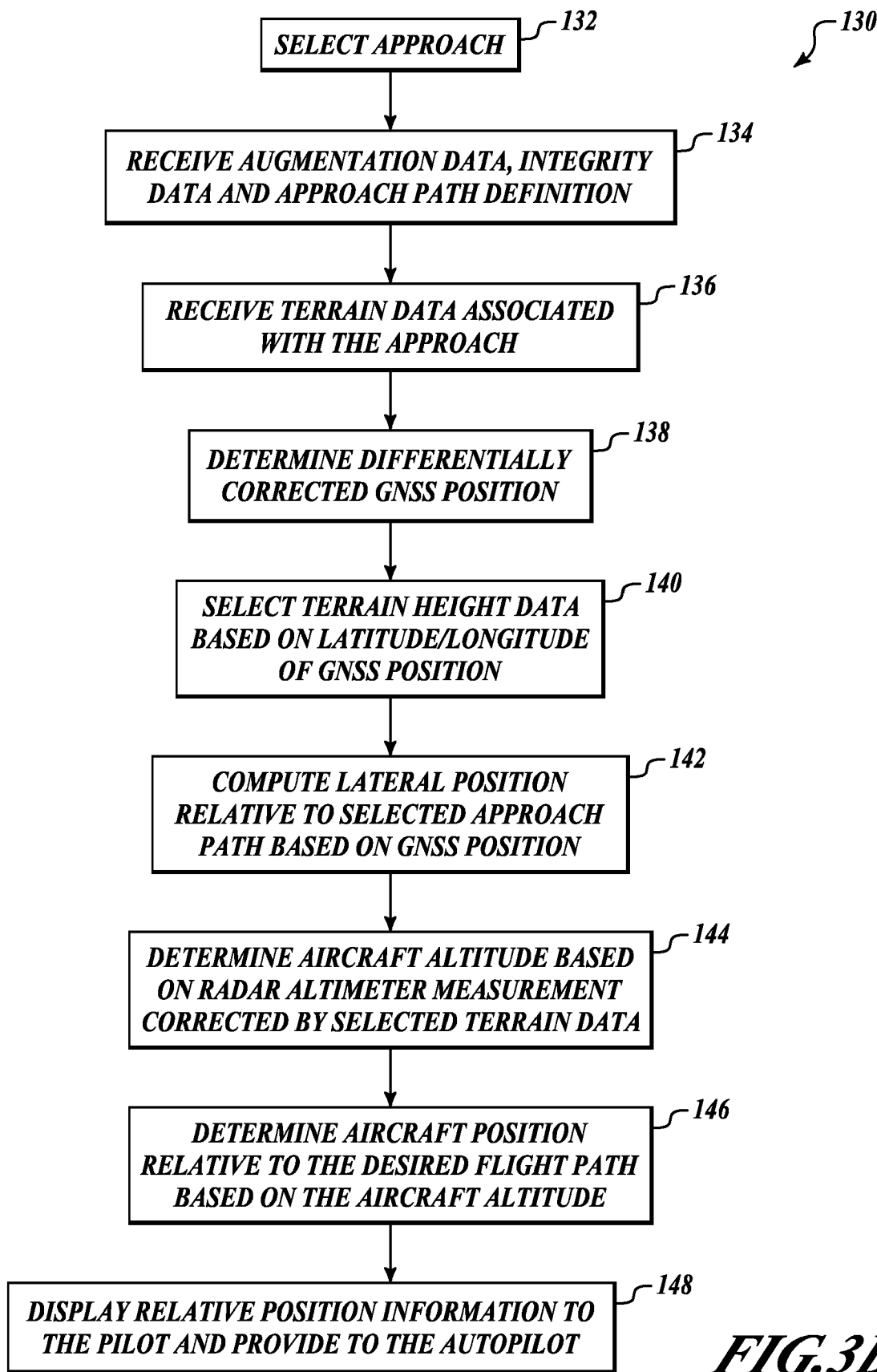

FIG. 3B an alternative process 130 that is performed by the processor 68. The process 130 begins at a block 132, where an instrument landing approach is selected. At a block 134 and 136, the processor 68 receives augmentation data, integrity data, an approach path definition, and terrain data associated with the approach path definition. At a block 138, differentially corrected GNSS position is determined. At a block 140, terrain height data is selected based on latitude/longitude of determined GNSS position. At a block 142, lateral position of aircraft relative to the selected approach is computed based on the GNSS position. At a block 144, aircraft altitude is determined based on radar altimeter measurement corrected by terrain data. At a block 146, aircraft position relative to the desired flight path is determined based on the aircraft altitude. At a block 148, the determined aircraft position is displayed to the pilot or provided to the autopilot 64.

One possible implementation of an algorithm for combining the corrected radio altimeter information with GNSS pseudorange information is described below. If differential corrections are available for four or more satellites for which corresponding airborne pseudorange measurements are available, the processing 68 applies the differential corrections. If radio altimeter and terrain data is also available, a measurement of the range between the radio altimeter antenna and the center of the earth 44 are formed by adding the measured height above the terrain to the height of the terrain contained in the terrain database.

One acceptable means of computing the position based on the basic linearized GPS measurement model is described below. Computing the position based on radio altimeter information:

The measurement model is $$\Delta y = G \Delta x + \epsilon \quad [1]$$

where:

$\Delta x$ is the four dimensional position/clock vector (ground-track, cross-track, up and clock) relative to the position/clock vector x for which the linearization has been made;

$\Delta y$ is an N+1 dimensional vector. The first N elements contain the differentially corrected pseudorange measurements minus the expected ranging values based on the location of the satellites and the location of the user (x). The last element includes the range measurement to the center of the earth based on the combination of the radio altimeter measurement to the terrain and information regarding the height of the underlying terrain relative to the WGS-84 ellipsoid.

N is the number of ranging measurements;

G is the observation matrix that includes N rows of line of sight vectors from x to each satellite, augmented by a "1" for the clock and one row containing a unit vector pointing in the vertical (down) direction. Thus, for the first N rows, the $i^{th}$ row corresponds to the $i^{th}$ satellite in view and can be written in terms of the elevation angle $El_i$ and the azimuth angle $Az_i$ relative to the runway frame.

$$G_i = [\cos El_i \cos Az_i \cos El_i \sin Az_i \sin El_i \; 1] \quad [2]$$

The final row is given by:

$$G_{(N+1)} = [0 \; 0 \; -1 \; 0] \quad [3]$$

Note that a "1" is not included in the last column for the last row because the radio-altimeter based measurement does not have the uncertainty due to the clock state. There will be some error in the measurement due to timing uncertainties, but these should be accounted for by including an allocation for latency in the error budget for the vertical measurement.

$\epsilon$ is an N dimensional vector containing the errors in y.

The weighted least squares estimate of the states, $\Delta \hat{x}$, can be found by:

$$\Delta \hat{x} = S \cdot \Delta y \quad [4]$$

where:

$$S \equiv (G^T \cdot W \cdot G)^{-1} \cdot G^T \cdot W \quad [5]$$

-continued $$W^{-1} = \begin{bmatrix} \sigma_1^2 & 0 & \cdots & 0 & 0 \\ 0 & \sigma_2^2 & & \vdots & \vdots \\ \vdots & & \ddots & 0 & 0 \\ 0 & \cdots & 0 & \sigma_N^2 & 0 \\ 0 & \cdots & 0 & 0 & \sigma_{RA}^2 \end{bmatrix} \quad [6]$$

$$\sigma_i^2 = \sigma_{pr\_gnd}^2[i] + \sigma_{tropo}^2[i] + \sigma_{pr\_air}^2[i] \quad [7]$$

$\sigma_{pr\_gnd}[i]$ is the total (post correction) fault-free error term associated with the corresponding differential correction for satellite i, as defined in RTCA/DO-246.

$\sigma_{tropo}[i]$ is a refractive uncertainty associated with the corresponding refractive index for satellite i.

$\sigma_{pr\_air}[i]$ is the total (post correction) fault-free airborne error term for satellite i.

$\sigma_{RA}$ is the total fault-free error term associated with the corrected radio altimeter data. See the section discussing the radio-altimeter measurements below.

S is the projection matrix that relates the range domain measurements ($\Delta y$) to the position domain estimates ($\Delta \hat{x}$).

The extension of this algorithm to a Kalman filter implementation is straight forward and should be easily accomplished by anyone familiar with Kalman filters. Similarly, the extension of the technique to include integrated inertial measurements is also straight forward. This can be accomplished by adding states for the inertial sensor measurement states to the Kalman filter implementation and using velocity, acceleration and Euler angle measurements from the inertial system as inputs to the filter.

Figure 4:
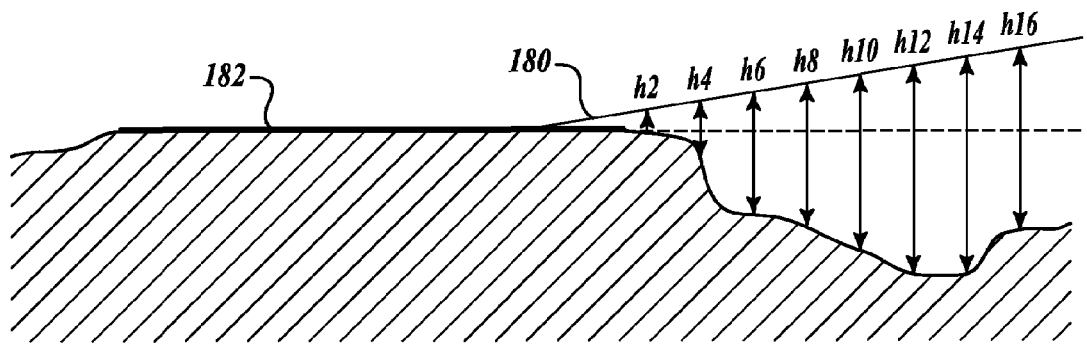
FIG. 4 illustrates a side view of an example terrain profile.

FIG. 4 illustrates one possible representation of the terrain data that is uplinked to the user. Referring to FIG. 4, the terrain data is expressed as a height relative to a specific Final Approach Segment (FAS) 180. The FAS 180 defines a desired aircraft flight trajectory on approach to a runway 182. The terrain data describes the height difference between selected points on the FAS 180 and the terrain directly below those points. The terrain height measurements ($h_1, h_2, \ldots h_n$) are provided for a predefined number of points along the FAS 180. The points along the FAS 180 provide a spatial sampling such that an aircraft at approach speeds is able to compute corrected altitude measurements at a rate of approximately 2 to 5 Hz. Other computation rates may be selected as desired. The radar altimeter 56 (FIG. 2) produces measurements at a higher rate. For example, at 140 nm/hr an effective rate of computation for corrected altitude corresponds to spatial sampling of 20 to 35 meters longitudinally for the uplink terrain data. Thus, if terrain data is to be provided for the last 2 miles of the FAS 180, then 106-186 terrain samples (cells) are used.

Other means of representing the terrain data are possible so long as the user can somehow relate the terrain data to the desired FAS and also determine the height of the terrain above the WGS-84 ellipsoid or other datum that may be used. (The World Geodetic System-84 is a standard definition of an earth fixed reference frame used by GNSS. WGS-84 uses a specific ellipse of rotation that approximates the earth's surface to define zero height within that reference frame.)

There are several ways that the altimeter data can be combined with the satellite data. One method is to use the terrain data to produce a corrected radio altimeter measurement that would give a measurement of vertical position relative to the WGS-84 ellipsoid. The corrected radio altimeter measurement is then treated just like an additional GPS ranging measurement from a satellite situated at the center of the earth 44. A position estimate is used to determine the appropriate terrain data (cells) to apply to the altimeter measurement.

Another method is to compute a longitudinal position solution based on differential GPS alone. The longitudinal position is used to determine which terrain data should be used to produce the corrected altimeter measurement. The corrected altitude represents the vertical displacement between the radio altimeter antenna and the desired FAS. This relative altimeter measurement may also be compared to the vertical position measurement obtained from differential GPS for the purpose of fault detection, thereby enhancing integrity.

Another method for combining the measurements is to combine the radar altimeter altitude measurements, the terrain data profile, the GPS measurements along with pitch, roll, heading, and body axis velocities and accelerations from the INS 60 in a Kalman filter (KF). The Kalman filter is designed to produce the best possible position estimate given all the data. This filtering technique performs some time averaging or smoothing, which reduces measurement noise and increases accuracy. In essence the KF combines the high frequency information of the INS with the low frequency information from differential GNSS and the relative radio altimeter measurements. The Kalman filter is a recursive technique of obtaining the solution to a least squares fit. This recursive method has an advantage of computational efficiency. However, other solutions for obtaining the solution to a least squares fit may be used as desired for a particular application.

The international standards for GBAS 30 defines a VHF broadcast only datalink VHF Data Broadcast (VDB) that delivers GPS differential corrections, satellite integrity information, and a definition of the desired flight path to the aircraft 36. The VDB transmission is based on a differentially encoded 8 Phase Shift Keyed (D8PSK) waveform that supports a transmission rate of 31.5 kilo-bits per second in a channel, such as without limitation a 25 kHz channel.

Figure 5:
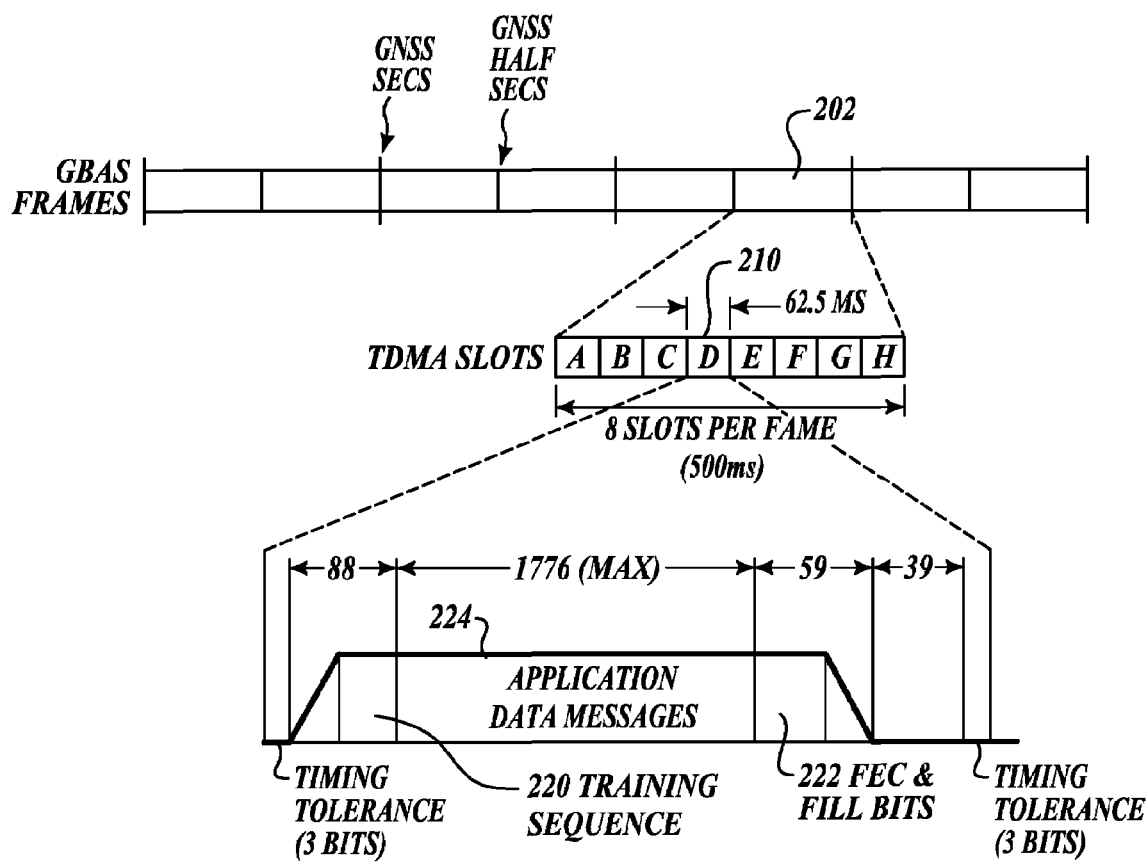
FIGS. 5 and 6 illustrate exemplary data transmission protocols used by the systems shown in FIGS. 1 and 2.

Referring now to FIG. 5, an exemplary broadcast protocol used in an embodiment of the present invention includes GBAS frames 202 separated into Time Division Multiple Access (TDMA) slots 210, so that multiple ground facilities can share a single channel assignment. In one embodiment, the TDMA slots 210 are based on dividing each second into two half-second frames and then further dividing each frame into 8 equal slots of time. Each TDMA slot 210 includes a burst of information that includes a training sequence 220, an application data message block 224, and forward error correction (FEC) and fill bits 222. A GBAS 30 is assigned one or more slots within a GBAS frame 202 so that the nominal VDB transmission rate is 2 Hz (i.e. at least one slot per frame) or greater. Every ground facility is inherently time synchronized through GNSS time. So, every ground station can independently conform to the structure of the TDMA slot 210 without direct coordination between the ground facilities. Other transmission protocols and frequencies may be used.

Figure 6:
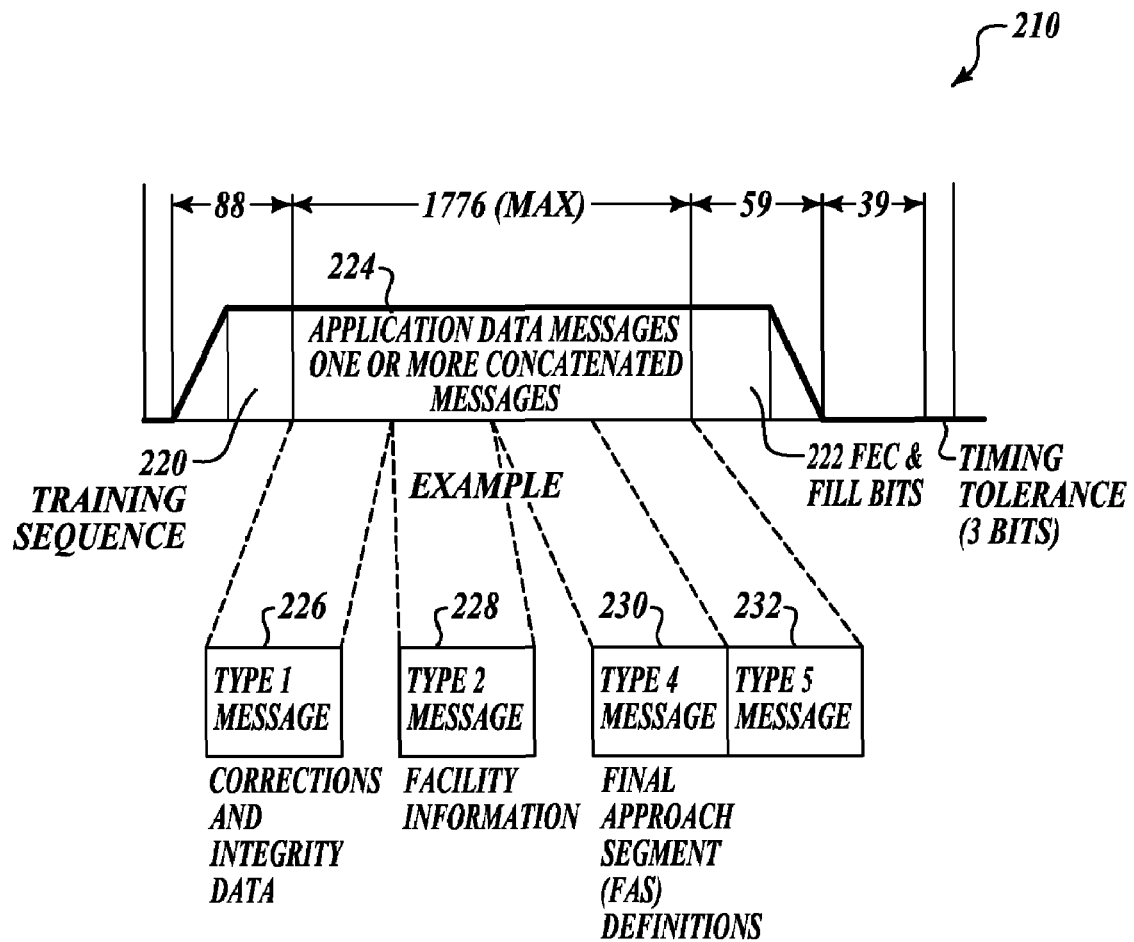

FIG. 6 illustrates division of the data content within a GBAS transmission burst 216 within a TDMA slot 210. The Application Data Message block 224 includes 4 types of messages 226-232. The current international standards for GBAS 30 includes definitions for 3 types of messages. They include: a Type 1 Message 226; a Type 2 Message 228; and a Type 4 Message 230.

The Type 1 Message 226 includes satellite pseudorange correction data for each of the satellites 26. Message Type 1 also includes integrity information for each of the satellites 26.

The Type 2 Message 228 includes general GBAS facility information. The general GBAS facility information includes reference location for the GBAS corrections, a GBAS identifier, the GBAS station type, parameters for ionospheric and tropospheric decorrelation model, and other information.

The Type 4 Message 230 includes FAS definitions. This message includes data blocks of one or more FAS. Each FAS data block includes data that defines the mathematical definition of a line in space that defines the FAS to a runway. The FAS data block also includes runway identifier information and an indication of the level of service that corresponds to the particular approach. The level of service defines the navigation system accuracy required for the approach in terms of accuracy, integrity and continuity of function. There are specific functional requirements for the airborne equipment that depend on the specific level of service to be achieved.

One possible implementation of the current invention would be to introduce a new message: a Type 5 Message 232. The Type 5 Message 232 includes the terrain data for an FAS approach. The terrain data message is suitably uplinked at a fairly low rate (e.g. once each 5 to 10 sec) so that the impact on the VDB capacity is manageable.

In one embodiment, the terrain data in a given message is associated with a specific approach by referencing an existing Reference Path Data Selector (RPDS) of the associated FAS. An example of the format for the new Type 5 message 232 is given in Table 1. In this example, it is assumed that the FAS path is sampled with a resolution defined by a longitudinal spacing parameter that is included in the message. The longitudinal spacing parameter defines the longitudinal distance between each point in the terrain data. In this particular scheme, the terrain data are sampled uniformly. The message format then includes a list of N terrain data points defining the height of the FAS above the terrain. The first point in the list corresponds to the height of the FAS above the terrain 1 unit of longitudinal spacing before the Landing Threshold Point (LTP), typically at the runway threshold. The second point is the height of the FAS aboce the terrain 2 units of longitudinal spacing before the LTP and so on. At each point, a height and variance is given. In this example, the height allows for up to 1000 ft of altitude between the FAS and the terrain. The variance parameter is provided to cover the cases where some of the approach may be over water and hence the true height of the FAS might change with the tides and/or wave action. The variance parameter allows the airborne equipment to appropriately weigh the corrected altitude information and to set the thresholds for fault detection based on uncertainty of the height measurements. Table 1 illustrates an example format for the type 5 message 232. The Type 5 message is of variable length depending on the number of terrain data points (N) provided.

TABLE 1

| Data Content | Bits Used | Range of Values | Resolution |
|---|---|---|---|
| RPDS of Associated FAS | 8 | 0-48 | 1 |
| Number of Terrain Data Points (N) | 8 | 0-256 | 1 |
| Longitudinal Spacing | 8 | 0-50 meters | 0.1953 m |
| Measurement Type | 3 | 0-7 | 1 |
| Repeat For N Terrain Data Points: | | | |
| Height of FAS at Point I | 12 | 50-1000 ft | 1 |
| Variance of Height | 4 | 1-16 m | 1 m |

It will be appreciated that other means of sampling and encoding the terrain data are possible and the invention is general enough to encompass other approaches.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for performing instrument landings, comprising:
    receiving terrain data information from a ground-based augmentation system, the terrain data information including a height of a final approach segment above ground and a variance parameter to account for possible variations in height due to an approach over water;
    determining position of an aircraft, including receiving global positioning information from a global navigation satellite system and receiving a differential global positioning, the position of the aircraft being determined from the global positioning information and the differential global positioning information;
    generating altitude information of the aircraft from a radar altimeter; and
    determining an aircraft altitude based on the determined position of the aircraft, received terrain data information, and the generated altitude information.

2. The method of claim 1, receiving differential global information includes receiving differential global information from a ground-based augmentation system.

3. The method of claim 2, wherein determining an aircraft altitude includes:
    determining aircraft's position from the earth's center based on the generated altitude information of the aircraft from the radar altimeter and a portion of the received terrain data information.

4. The method of claim 3, wherein the terrain data information includes world geodetic information-84.

5. The method of claim 1, further comprising:
    sending the determined aircraft altitude to at least one of an autopilot and one or more aircraft displays.

6. The method of claim 1, wherein the instrument landing approach is at least one of a CAT II and CAT III approach.

7. The method of claim 1, wherein determining an aircraft altitude includes:
    identifying a terrain data component of the received terrain data information based on differential global positioning information;
    adjusting the generated radar altimeter altitude information based on the determined terrain data; and
    determining an aircraft altitude based on the adjusted altitude information.

8. The method of claim 7, wherein determining an aircraft altitude is further based on an altitude component of the differential global positioning information.

9. The method of claim 1, wherein determining an aircraft altitude includes obtaining the solution to a least squares fit based on the generated radar altimeter altitude information, the determined position of the aircraft, pitch, roll, and heading information, at least one of velocity or acceleration information for one or more axis of the aircraft.

10. The method of claim 9, wherein obtaining is perform by a Kalman filter.

11. An apparatus for performing instrument landings1, comprising:
    a communication component configured to receive terrain data information related to an instrument landing approach from a ground-based augmentation system, the terrain data information including a height of a final approach segment above ground and a variance parameter to account for possible variations in height due to an approach over water;
    a position determination component configured to receive global positioning information from a global navigation satellite system, and differential global positioning information, and to determine a position of an aircraft using the global positioning information and the differential global position information;
    an altitude generation component configured to generate altitude information of the aircraft from a radar altimeter; and
    a processing component configured to determine an aircraft altitude based on the determined position of the aircraft, received terrain data information, and the generated altitude information.

12. The apparatus of claim 11, wherein the processing component is further configured to determine the aircraft position from the earth's center based on the generated altitude information of the aircraft from the radar altimeter and a portion of the received terrain data information.

13. The apparatus of claim 12, wherein the terrain data information includes world geodetic information-84.

14. The apparatus of claim 11, further comprising:
    a transmission component configured to send the determined aircraft altitude to at least one of an autopilot and one or more aircraft displays.

15. The apparatus of claim 11, wherein the instrument landing approach is at least one of a CAT II and CAT III approach.

16. The apparatus of claim 11, wherein the processing component is further configured to identify a terrain data component of the received terrain data information based on differential global positioning information;
    adjust the generated radar altimeter altitude information based on the determined terrain data; and
    determine the aircraft altitude based on the adjusted altitude information.

17. The apparatus of claim 16, wherein the processing component is further configured to determine the aircraft altitude based on an altitude component of the differential global positioning information.

18. The apparatus of claim 11, wherein processing component is further configured to obtain a solution to a least squares fit based on the generated radar altimeter altitude information, the determined position of the aircraft, pitch, roll, and heading information, at least one of velocity or acceleration information for one or more axis of the aircraft.

19. The apparatus of claim 18, wherein the solution to a least squares fit is performed by a Kalman filter.

20. An aircraft system for performing instrument landings, comprising:
- a communication component configured to receive terrain data information from a ground-based augmentation system, the terrain data information including a height of a final approach segment above ground and a variance parameter to account for possible variations in height due to an approach over water;
- a positioning system configured to receive global positioning information from a global navigation satellite system, and differential global positing information, and to determine position of the aircraft based on the global positioning information and the differential global positioning information;
- a radar altimeter configured to generate altitude information of the aircraft; and
- a processor coupled to the communication component, the positioning system, and the radar altimeter, the processor being configured to determine an aircraft altitude based on the determined position of the aircraft, received terrain data information, and the generated altitude information.

21. The system of claim 20, wherein the positioning system is further configured to receive the differential global positioning information.

22. The system of claim 21, wherein the processor determines position of the aircraft from the center of the earth based on the generated altitude information of the aircraft from the radar altimeter and a portion of the received terrain data information.

23. The system of claim 22, wherein the terrain data information includes world geodetic information-84.

24. The system of claim 20, further comprising:
- a component configured to send the determined aircraft altitude to at least one of an autopilot and one or more aircraft displays.

25. The system of claim 20, wherein the instrument landing approach is at least one of a CAT II and CAT III approach.

26. The system of claim 20, wherein the processor identifies a terrain data component of the received terrain data information based on differential global positioning information, adjusts the generated radar altimeter altitude information based on the determined terrain data, and determines an aircraft altitude based on the adjusted altitude information.

27. The system of claim 26, wherein the processor determines an aircraft altitude based on an altitude component of the differential global positioning information.

28. The system of claim 20, further comprising an inertial system configured to generate at least one of velocity or acceleration information for one or more axis of the aircraft, wherein the processor obtains the solution to a least squares fit based on the generated radar altimeter altitude information, the determined position of the aircraft, pitch, roll, and heading information, and the at least one of velocity or acceleration information for one or more axis of the aircraft.

29. The system of claim 28, wherein the processor obtains the solution using a Kalman filter.

\* \* \* \* \*